United States Patent
Graf (10) Patent No.: US 7,854,338 B2
(45) Date of Patent: Dec. 21, 2010

(54) WATER TANK AND METHOD FOR MANUFACTURING A WATER TANK

(75) Inventor: Otto P. Graf, Teningen (DE)

(73) Assignee: Graf Plastics GmbH, Teningen (DE)

( * ) Notice: Subject to any disclaimer, the term of this patent is extended or adjusted under 35 U.S.C. 154(b) by 526 days.

(21) Appl. No.: 11/896,193

(22) Filed: Aug. 30, 2007

(65) Prior Publication Data

US 2008/0067179 A1    Mar. 20, 2008

(30) Foreign Application Priority Data

Sep. 4, 2006    (EP) ................................. 06018442

(51) Int. Cl.
  *B65D 6/00*    (2006.01)
  *B65D 6/28*    (2006.01)
  *B65D 88/76*    (2006.01)

(52) U.S. Cl. .................. 220/4.06; 220/567.1; 220/4.21; 220/4.05; 220/4.07

(58) Field of Classification Search ....... 220/4.05–4.07, 220/4.12, 4.13, 4.16, 4.24, 4.25, 565, 567.1, 220/658, 672

See application file for complete search history.

(56) References Cited

U.S. PATENT DOCUMENTS

| | | | | |
|---|---|---|---|---|
| 3,043,465 | A | * | 7/1962 | Horner ........................ 220/565 |
| 4,040,372 | A | * | 8/1977 | Flanders ........................ 413/9 |
| 4,254,885 | A | * | 3/1981 | Fouss et al. .................. 220/675 |
| 4,359,167 | A | * | 11/1982 | Fouss et al. .................. 220/675 |
| 4,938,680 | A | * | 7/1990 | Guarriello et al. ........... 425/522 |
| 5,072,851 | A | * | 12/1991 | Wilkes .................. 220/203.12 |
| 5,121,852 | A | * | 6/1992 | Wilkes .................. 220/203.12 |
| 5,361,930 | A | * | 11/1994 | Perry ......................... 220/565 |

(Continued)

FOREIGN PATENT DOCUMENTS

BE    1008443  A7  *  5/1996

(Continued)

OTHER PUBLICATIONS

Machine translation of BE1008443A7.*

(Continued)

*Primary Examiner*—Anthony Stashick
*Assistant Examiner*—Brett Edwards
(74) *Attorney, Agent, or Firm*—Baker & Hostetler LLP (57) ABSTRACT

A water tank T of plastic material which is joined by using at least two open and identical tank parts 1 and a joining plane 2, the tank parts having respective opening structures R with a flattened inner opening edge, a sealing channel 26 being open towards the joining plane, and an outer flattened opening edge, the inner and outer opening edges within the opening edge structure are situated in each tank part 1, 35 in the joining plane 2, the opening edge at the same time defining inner and outer fitting surfaces 16, 17, respectively with a width exceeding the thickness X of the tank part wall 30 and the sealing channel wall 34 by at least about the half, such that the water tank T selectively can be manufactured from the same tank parts 1, 35 either monolithically by welding the fitting surfaces 16, 17 without sealing means in-between to each other or separable by clamping the opening edge structures R from the outer side with sealing means 33 provided between both tank parts 1, 35.

5 Claims, 5 Drawing Sheets

U.S. PATENT DOCUMENTS

| | | | | |
|---|---|---|---|---|
| 5,365,830 | A | * | 11/1994 | MacLennan et al. .......... 99/276 |
| 5,503,886 | A | * | 4/1996 | Guarriello et al. .......... 428/35.7 |
| 5,670,108 | A | * | 9/1997 | Kern et al. .................. 264/248 |
| 5,878,907 | A | * | 3/1999 | Graf .......................... 220/324 |
| 6,056,137 | A | * | 5/2000 | Cannan et al. ............. 220/4.12 |
| 6,227,396 | B1 | * | 5/2001 | Small ........................ 220/4.12 |
| 6,284,181 | B1 | * | 9/2001 | Gaster ........................ 264/263 |
| 7,178,686 | B2 | * | 2/2007 | Bolzer et al. ............. 220/567.1 |
| 7,228,986 | B2 | * | 6/2007 | Hayes et al. ................. 220/675 |
| 7,572,372 | B2 | * | 8/2009 | Graf ........................... 210/232 |
| 2002/0153380 | A1 | * | 10/2002 | Wade ......................... 220/659 |
| 2003/0136789 | A1 | * | 7/2003 | Bolzer et al. ............. 220/567.1 |
| 2004/0011786 | A1 | * | 1/2004 | Wade ....................... 220/4.13 |
| 2006/0124640 | A1 | * | 6/2006 | Richter ...................... 220/4.21 |

FOREIGN PATENT DOCUMENTS

| | | |
|---|---|---|
| DE | 94 16 068 | 12/1994 |
| DE | 199 09 041 A1 | 9/2000 |
| EP | 0 064 310 A2 | 11/1982 |
| EP | 0 870 877 A1 | 10/1998 |
| JP | 10 174985 A | 6/1998 |

OTHER PUBLICATIONS

"Systematic Rainwater Use", p. 34, edition 2006, Otto Graf GMBH Plastic Products, D-9331, Teningen, Carl-Zeiss-Str. 2-6, catalogue R26.

* cited by examiner

WATER TANK AND METHOD FOR MANUFACTURING A WATER TANK

CROSS-REFERENCE TO RELATED APPLICATIONS

This application claims priority of European Patent Application No. 06018442.1, filed Sep. 4, 2006, the disclosure of which is hereby incorporated by reference in its entirety.

FIELD OF THE INVENTION

The invention relates to a water tank made from plastic material, which water tank is to be joined from at least two open tank parts the tank parts having opening edge structures matching each other in a joining plane each opening edge structure having a flat inner opening edge continuing a wall of the tank part a sealing receiving channel for a sealing means, the sealing receiving channel being open towards the joining plane, and an outer flat opening edge continuing wall of the sealing receiving channel, the opening edges being aligned with each other in the joining plane in joined condition of the water tank and being inner and outer fitting surfaces respectively with a width exceeding the thickness of the wall of the tank part and the wall of the sealing receiving channel by at least about the half, the opening edge structures being designed such that the water tank is to be assembled from the tank parts in a separable watertight version by local releasable clamping joining of the opening edge structures wherein the water tank is assembled in a monolithic version from the tank parts of the separable version, which tank parts are identical to each other and are fabricated by injection moulding or injection moulding and embossing monolithically by welding the fitting surfaces with empty sealing receiving channels on each other; and to a method wherein within at least one separation wall holding pocket between two of the ribs of the semi-cylindrical part at least one sealing holding web is formed, preferably a pair of sealing holding webs, the sealing holding web extending across the inner side of the cover lid in the dome boss and terminating in the joining plane as a supplemental extension of the inner fitting surface, which extension enlarges the welding surface in the monolithic version of the water tank.

BACKGROUND OF THE INVENTION

The opening edge structures of the tank parts of the water tank known from EP 0870877 B1 and from the brochure "Systematic Rainwater Use", page 34, edition 2006, of the company Otto Graf GmbH Plastic Products, D-9331, Teningen, Carl-Zeiss-Str. 2-6, catalogue R26, are designed such that the outer flattened opening edge only has a width corresponding to the thickness of the sealing channel wall, and the inner opening edge has a width corresponding to the thickness of the tank part wall. The water tank is manufactured from two cup-shaped, identical halves by local clamping joining of the opening edge structures with clamp-shaped quick connectors. When both halves are joined and clamped together, the outer opening edges contact each other, while the inner opening edges are distant from each other. A unitary sealing strip is contained in the sealing channels of both halves. The sealing strip has a double conical cross-section. The quick connectors are pushed at the outer side along the circumference of the water tank over the clamp skewbacks. The quick connectors and the sealing strip contribute significantly to the cost of the water tank. The plastic material e.g. is HDPE or PP, in particular glass fibre reinforced PP. The water tank can only be assembled with the quick connectors in separable form. This joining principle is of advantage when the halves have to be transported for long distances to the site or into foreign countries, because the halves are stacked during transport for logistic reasons, require, however, a relatively complicated assembly on site. Manipulating the heavy halves during the assembly with a the weight of one half of e.g. 30 kg, threading the sealing strip and mounting the e.g. 24 quick connectors is time-consuming and means a significant cost factor which might negatively influence the acceptance at the site of some end users. In case of shorter transport distances or favourable transport conditions e.g. inland, the cost factor of the assembly on site may become much more important than the cost advantage of a stacked transport. This means that then the assembly of the water tank already at the producer's site or at the distributor and the delivery of the assembled water tank would be more favourable and more acceptable to more end users. In such cases it would be desirable to deliver the water tank ready for installation, however, without quick connectors and the sealing strip, e.g. by welding the halves to each other without quick connectors and without a sealing strip. However, the narrow opening edges of the halves of the known water tank do not allow reliable and watertight welding.

DE 9416968 U discloses an exclusively separable version of a water tank which is joined from two tank parts which are not identical among each other. The tank parts are deep drawn from fibre reinforced plastic material. The releasable clamping connections of the tank parts are local screwed connections along the opening edge structures of both tank parts. The tank parts are screwed together with the sealing means inserted into the sealing channels to make the water tank watertight. Inclined alternating flange portions at the outer side of the outer fitting surfaces protrude downwards and upwards beyond the joining plane to facilitate centering the tank parts prior to the joining process. The inclined flange portions increase the stiffness of the opening edge structures. Ribs formed in the tank part walls terminate with a distance from the joining plane at a circumferentially continuous apron. The tank parts either are joined at the manufacturer's site or on site.

DE 19909041 A discloses a multi-chamber plastic material container assembled from two injection moulded container parts which are not identical among each other and which have wide fitting surfaces in the joining plane which fitting surfaces are wider than the wall thickness. The container is intended to be mounted in automobiles. The fitting surfaces are surface-fused and pressed against each other when joining the container parts by welding. The container typically is used to store operating liquids like a brake liquid or windshield cleaning liquids.

SUMMARY OF THE INVENTION

It is an object of the invention to provide a fair cost, reliable water tank of the kind as disclosed at the beginning, which can be manufactured universally with a view to differing demands at the site of end users and to different transport conditions, and which is available in a versatile fashion.

This object is achieved whereby a water tank made from plastic material joined from at least two open tank parts wherein the tank parts have opening edge structures matching each other in a joining plane, each opening edge structure has a flat inner opening edge continuing a wall of the tank part, a sealing receiving channel for a sealing means, the sealing receiving channel being open towards the joining plane, and an outer flat opening edge continuing wall of the sealing receiving channel, the opening edges being aligned with each other in the joining plane in joined condition of the water tank and being inner and outer fitting surfaces respectively with a width exceeding the thickness of the wall of the tank part and the wall of the sealing receiving channel by at least about the half, the opening edge structures being designed such that the water tank is to be assembled from the tank parts in a separable watertight version by local releasable clamping joining of the opening edge structures, wherein the water tank is assembled in a monolithic version from the tank parts of the separable version, which tank parts are identical to each other and are fabricated by injection moulding or injection moulding and embossing monolithically by welding the fitting surfaces with empty sealing receiving channels on each other.

This object is also achieved whereby at least one separation wall holding pocket between two of the ribs of the semicylindrical part at least one sealing holding web is formed, preferably a pair of sealing holding webs, the sealing holding web extending across the inner side of the cover lid in the dome boss and terminating in the joining plane as a supplemental extension of the inner fitting surface, which extension enlarges the welding surface in the monolithic version of the water tank.

By forming the opening edge structure of each tank part of identical tank parts, which can be produced for fair costs in the same moulding tool, with inner and outer fitting surfaces which are separated from each other by the sealing channel and which have widths which exceed the wall thickness of the respective wall extending to the fitting surface by at least the half, and by providing clamp skewbacks adjacent to the outer fitting surface, each tank part which is produced in a single injection moulding tool selectively may be used for manufacturing either a monolithic water tank which is welded at the fitting surfaces without clamps and sealing means or for assembling a conventionally clamped and sealed water tank, respectively. This concept improves the acceptance at the end users, in particular in case of shorter transport distances, because the end user receives a monolithic water tank largely ready for use which may be cheaper than the separable version because of the elimination of the clamps and the sealing means, and which does not need to be assembled on site. In cases in which e.g. transports costs are a dominant factor or when the end user insists on having a separable water tank, the stacked tank parts may be transported and may be joined by clamping on site. Due to the resulting higher number of pieces of tank parts the producer may lower the prices resulting in a further improved acceptance by the end user for both the monolithic and the separable water tanks. As a result and without addition costs the versatile concept allows to enter a market segment with both versions which market segment is wider than the market segment available for separable water tanks only. The intentional broadened fitting surfaces allow a welding joint having high quality and high reliability without expensive sealing means and clamps, as the broad fitting surfaces compensate for relative misalignments during the welding process which misalignments may originate from the production, production tolerances or the material used, or by temperature influences or acting forces. The broad fitting surface also is of advantage in the separable version of the water tank because of an increased stability of the clamped and sealed opening edge structures. The stackability of the tank parts for the transport and for storing the tank parts is not interfered with by the design of the opening edge structures. However, a basic prerequisite is to form both tank parts identically which allows to use a single injection moulding tool, irrespective of whether a monolithic or a separable water tank is to be manufactured.

According to the method continuously welding the abutting inner and outer fitting surfaces of the identical tank parts to each other, which tank parts per se are prefabricated to manufacture a separable water tank, can be carried out for fair costs and with reliability such that the end user will receive a water tank which is largely ready for use. On the other hand, the fitting surfaces do not create any drawback in the separable version of the water tank when joining the delivered tank parts with the inserted sealing means by clamping. When joining the tank parts by clamping the fitting surfaces, in some cases, may be kept distant from each other by the sealing means or even may abut with weak contact pressure.

The tank parts, expediently, are stable, and form stable plastic material injection moulded and embossed parts with very accurate dimensions. Different to injection moulding, injection moulding and embossing is carried out with a controlled follow-up stroke of one mould half after the injection in order to produce the injected moulded and embossed form part without distortions and with high form accuracy. This allows e.g. among others to use plastic material with reinforcement. During the injection moulding and embossing process a lower inner pressure is needed and a smaller machine can be applied in relation to normal injection moulding processes. Plastic materials which have particularly useful here e.g. are HDPE or PP (high density polyethylene or polypropylene).

Expediently, the opening edge structure is provided with clamping skewbacks along the circumference and at spaced apart locations directly at the outer side adjacent to the outer fitting surface or at a prolonging flange adjacent to the outer fitting surface. These clamping skewbacks are used when manufacturing the separable water tank but do not have any function in the monolithic water tank. For this reason, in some cases together with the prolonging flange, the clamping skewbacks may be removed already at the site of the producer of the water tank and after forming the tank parts, or even after the welding process.

Both, the form stability of the water tank and the universal modular possibilities of shaping the water tank are improved since the wall of each tank part is formed with inwardly protruding ribs which extend about perpendicular to and into the joining plane and are distant from each other along the inner fitting surface. The rib end regions form an extension of the inner fitting surface in the joining plane. For the monolithic water tank the welding surfaces are enlarged and the welded connection will be very stable in terms of static requirements. The increased form stability also allows to provide relatively large volumes, and guarantees high stability against pressure forces from the inner side and/or the outer side.

Although the water tank can be assembled, as known per se, from two cup-shaped tank parts, it may be particularly expedient to manufacture the water tank at least substantially as a hollow cylinder having outwardly rounded end caps, with the opening edge structures placed in longitudinal direction of the cylinder such that the cylinder axis lies in the joining plane. A cylindrical shape with rounded end caps is known from one piece rotation formed containers, however, has not been realised until now in water tanks assembled separable or monolithically of at least two tank parts. Due to the in-built ribs and the stable opening edge structures water tanks can be manufactured which have a content between about 1000 liters to about 6000 liters and even more, e.g. in size steps from 1000, 2000, 2500, 3500, 4500, 5000, 6000, 8000, 9000, 10000 and 12000 liters. These water tanks may be installed below or on the surface. In each tank part the ribs are provided in both end cap halves and in the cylindrical part and are parallel to each other in the cylindrical part in order to significantly increase the form stability of the tank part and in turn of the water tank. The ribs may be formed continuously in the cylindrical part of the tank part, while the ribs in the end cap halves terminate with a distance from the first and last rib in the cylindrical part. This concept is of advantage for moulding reasons.

In a further, expedient, embodiment an e.g. circular round dome boss is formed into the cylindrical part of the tank part parallel to the joining plane. The ribs of the cylindrical part are interrupted in the region of the dome boss. The dome boss contains a round lid disc which is parallel to the joining plane and which is substantially flush with the outer contour of the end cap halves. This concept improves the stackability of the tank parts for transporting the tank parts. Furthermore, each tank part is compact in a direction perpendicular to the joining plane. The lid disc can easily be removed from one tank part, e.g. in order to then insert a tank dome later.

In a further, expedient, embodiment each rib end region defines a closed, e.g. trapezoidal or triangular cross-section in the opening edge structure, such that a respective closed flat edge with the form of the rib cross-section is defined as a weldable extension of the inner fitting surface. Particularly expedient is when this edge formed by the rib end surrounds a recess which is set back in relation to the joining plane in order to define the edge with substantially constant width for the welding process which edge continues without any steps into the inner fitting surface. The usable welding surfaces are enlarged and the operation reliability is increased because the rib ends forming an extension of the inner fitting surfaces in the joining plane as well are welded to each other. An insertion socket for a centering member is formed in the bottom of the recess, of at least several or of all ribs. The recess has, as mentioned, the purpose of defining an edge of substantially constant width for welding the monolithic water tank. At the same time, the recesses have the secondary function of receiving centering members which first facilitate the assembly of the separable water tank and later increase the stability of the joint. This simplifies the assembly of the separable water tanks significantly and contributes to a relief of the sealing means from shear forces.

In a further, particularly expedient, embodiment a separation holding pocket is formed between respective two ribs of the cylindrical part. The separation wall holding pocket is open also in the joining plane. This pocket may, if desired, be used to install at least one separation wall in the water tank (multi-chamber principle), as may be useful in several application cases.

According to a further important aspect of the invention a sealing holding web is formed parallel to the ribs in the tank part inner side between at least two ribs in the cylindrical part. The sealing holding web allows in case of the separable version of the water tank to seal the circumference of a moulded separation wall. In the monolithic version the at least one web offers the additional advantage of forming a further extension of the inner fitting surface in the joining plane, i.e. to further enlarge the weldable surface.

According to the method each opening edge structure is made by injection moulding with clamping skewbacks adjacent to the outer fitting surface. When producing the monolithic water tank each clamping skewback is removed mechanically prior to or after the welding process, since the skewbacks are not needed in the monolithic water tank. However, it should not be excluded that the clamping skewbacks may remain even at the monolithic water tank.

According to the method, furthermore, during the welding process each fitting surface is plasticised thermally, before subsequently the plasticised fitting surfaces are pressed against each other, preferably until welding beads are formed in the joining plane which are squeezed outwardly. The occurrence of the welding beads indicates that the welded joint has been made continuously and stably and will be watertight.

Finally, it may be expedient to form, according to the method, each opening, edge structure with an outside prolonging flange adjacent to the outer fitting surface and to form the clamping skewbacks at the prolonging flange such that they face away from the joining plane. In case of manufacturing the monolithic water tank the fitting surfaces of both tank parts are welded until welding beads are squeezed outwardly in the joining plane. Since at least the outside welding bead, as conventional, e.g. for a aesthetical reasons, ought to be removed, this removing process can be used to also remove the prolonging flange and the clamping skewbacks together with the outside welding bead. This measure reduces the transport weight of the monolithic water tank and creates an aesthetically attractive appearance in the joint region.

BRIEF DESCRIPTION OF THE DRAWINGS

Embodiments of the invention will be explained with the help of the drawings.

DESCRIPTION OF THE PREFERRED EMBODIMENTS

Figure 1:
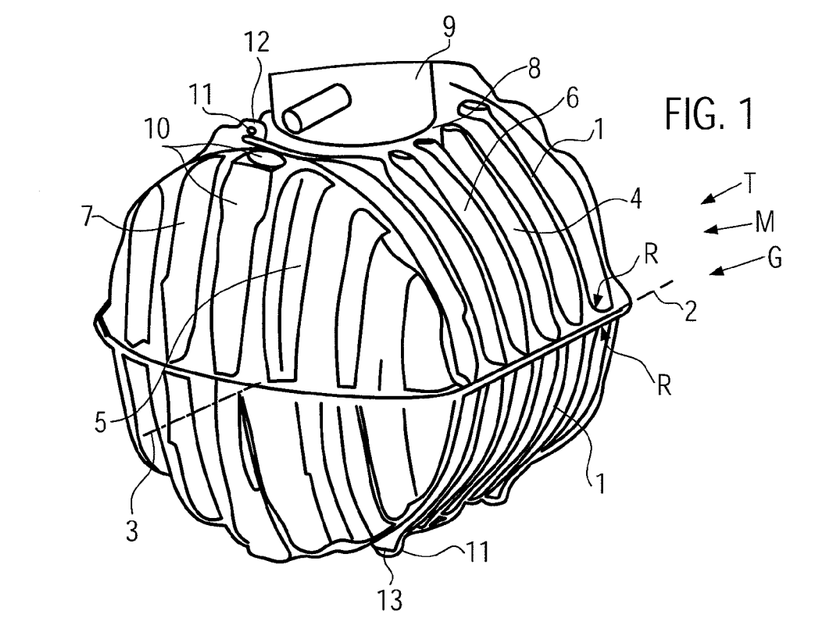
FIG. 1 a perspective view of a monolithic water tank joined from two identical tank parts.

A water tank T schematically shown in FIG. 1 is assembled by joining two identical, open tank parts 1 having identical opening edge structures R. The water tank T is assembled either monolithically M, i.e. such that it cannot be separated anymore, or separable G.

In FIG. 1 the water tank T has the shape of a horizontally lying cylinder with an at least largely cylindrical contour and end caps 5 which are rounded outwardly at both cylinder ends. Ribs 6 are formed in each tank part 1 which ribs protrude inwardly, are parallel to each other, and extend substantially perpendicular to a joining plane 2 and such that the ribs 6 directly terminate in the opening edge structures R. The ribs are separated in the region of a round dome boss 8, or instead are flattened there, which dome boss 8 is formed substantially in the middle between the end caps 5. The axis of the cylinder indicated with the reference 3, consequently is situated in the joining plane 2 in which the opening edge structures R are joined with each other. However, the water tank T instead (not shown) could be joined from two cup-shaped tank parts 1 such that this water tank then has the shape of an upright standing barrel. Furthermore, a round upright standing or lying water tank could be made, in some cases such that it can be extended in modular fashion.

Substantially parallel ribs 7 are also formed in the end caps 5 or in each end cap half, which ribs 7 protrude inwardly and which terminate at the opening edge regions of the end caps 5.

A tank dome 9 can be mounted (FIG. 1) into the dome boss 8, which first is closed by a round lid disc 14. The tank dome 9 is mounted after removing the lid disc 14.

Pre-shaped regions 10 may be formed in the tank parts for later connecting pipings. Furthermore, feet 11 might be provided distributed around the respective dome boss 8. The feet 11 are provided with hoisting eyelets 12. Elastic foot parts 13 may be inserted selectively into the feet 11 (respectively, at the lower side of the water tank) for transport purposes.

Both tank parts 1 are identical plastic material injection moulded parts, expediently, injection moulded and embossed form parts. Embossed form parts are more strongly embossed during the injection moulding process by a follow-up stroke of one moulding half. Then the inner pressure during the process can be selected lower, and a smaller injection moulding machine may be used. The plastic material may be among others HDPE or PP without reinforcements, although other plastic materials may be useful as well. In some cases even plastic material can be used which is fibre reinforced or mineral reinforced. As the tank parts 1 are identical, they may be produced in one and the same injection mould. In this case the opening edge structures R of the tank parts 1 are designed such that they allow to selectively assemble the water tank T monolithically M or separably G. In the case of the monolithic water tank T the tank parts 1 are welded to each other twofold with the opening edge structures R. In the separable water tank T the opening edge structures R are joined locally by clamping joining. Then a continuous sealing means and in some cases centering members may be inserted between the opening edge structures R. When clamping (not shown in FIG. 1) quick connectors like clamps are shifted on clamping skewbacks in the direction of the joining plane and along the circumference such that they span the tank parts against each other.

The tank parts 1 can be stacked within each other, irrespective of whether monolithic or separable water tanks will be manufactured.

The water tank T e.g. may have a volume between about 1000 liters to about 12000 liters, e.g. is available in volume steps from 1000 liters, 2000 liters, 2500 liters, 3500 liters, 4500 liters, 5000 liters, 6000 liters, 8000 liters, 9000 liters, 10000 liters and 12000 liters.

Figure 2:
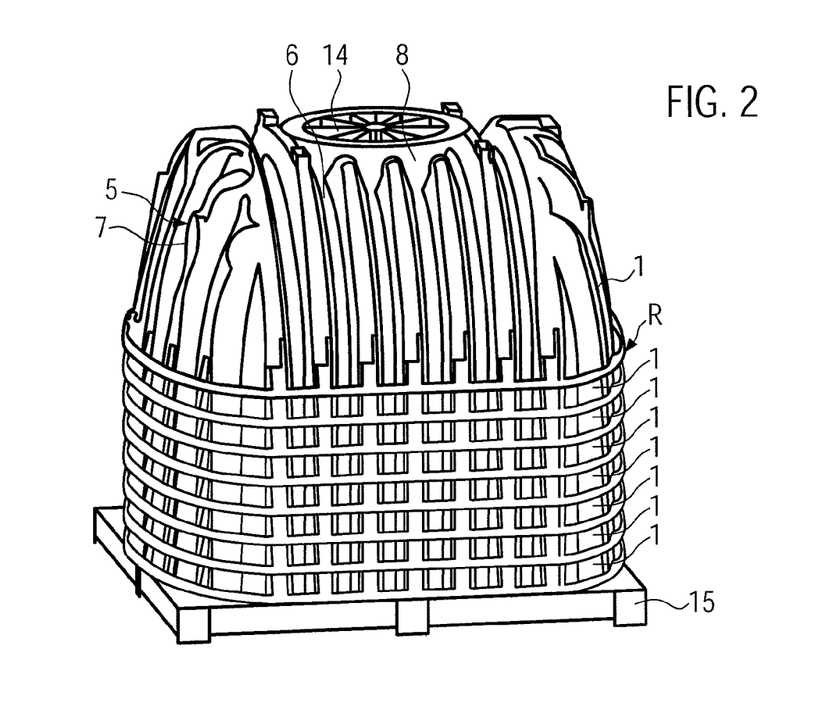
FIG. 2 several tank parts which are stacked for transport purposes for manufacturing water tanks in separable versions.

FIG. 2 shows totally eight tank parts 1 which are stacked within each other, e g. while storing the tank parts for later assembling four monolithic water tanks, or as a ready transport package on a pallet 15 for later assembling four separable water tanks on site. The lid discs 14 still may be contained in the dome bosses of the tank parts 1. In some cases, already at the site of the producer of the tank parts, the lid discs 14 of each second tank part may be removed. The tank parts 1 are stacked into each to a depth that the opening edge structures R are close to each other but do not contact each other.

Figure 3:
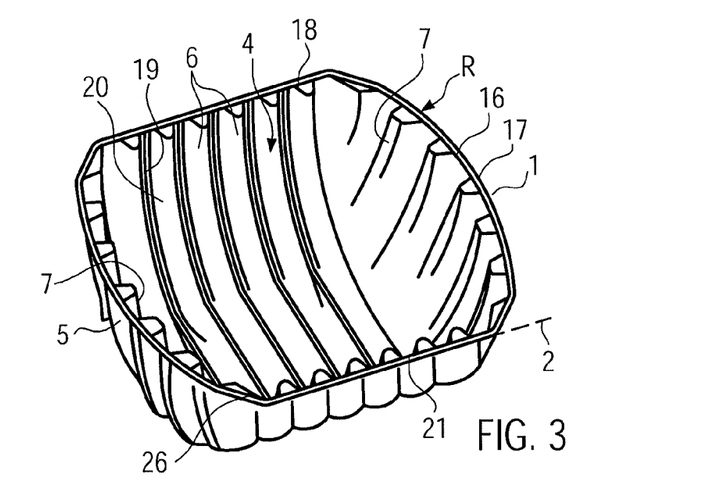
FIG. 3 a partial sectional view of a joint region of the monolithic water tank of FIG. 1.

FIG. 3 is an inner view of a tank part 1 and illustrates the extension of the ribs 6 in the cylindrical part 4 and the extension of the ribs 7 in each end cap half 5. All ribs 6, 7 extend into the joining plane of the opening edge structure R. Each rib end 18 defines an extension area of an inner fitting surface 16 of the opening edge structure R as explained in more detail with the help of FIG. 4. Furthermore, respective two ribs 6 in the cylindrical part 4 of the tank part 1 form a perspective separation wall holding pocket 20. A separation wall may be inserted upon demand there (multi-chamber water tanks). At least one sealing holding web 19, preferably a pair of such webs, extends parallel to the ribs 6 at the bottom of the separation wall holding wall pocket 20. Each web 19 extends into the joining plane 2 and forms an extension surface of the inner fitting surface 16 there. The inner fitting surface 16 is separated from a parallel outer fitting surface 17 of the opening edge structure R by a sealing channel 26. Both fitting surfaces 16, 17 extend continuously along the circumference of the opening edge structure R and serve to join two tank parts 1 to the monolithic water tank T by welding.

Figure 4:
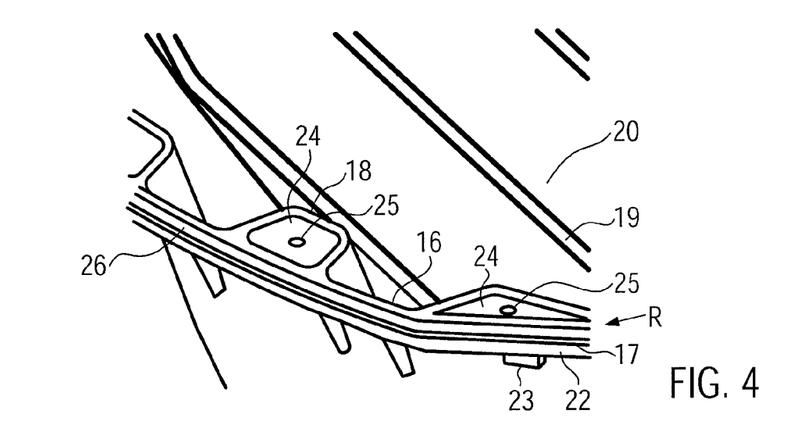
FIG. 4 a partial section of the joint region of the separable version of the water tank.

FIG. 4 illustrates in enlarged scale the course of the inner and outer fitting surfaces 16, 17 of the opening edge structure R with the extension by the rib ends 18 which are continued into the inner fitting surfaces 16. The rib ends 18 form edge strips having substantially constant width and following a trapezoidal or triangular shape, such that a large welding surface can be used for the welding process after which the ribs 6, 7 improve the static composite. The sealing channel 26 extends between the inner and outer fitting surfaces 16, 17. In some cases a flange 22 prolongs the outer fitting surface 17. Clamping skewbacks 23 are formed at the flange 22 such that they face away from the joining plane.

The fitting surfaces 16, 17, 18 are situated in the joining plane. Each rib end 18 surrounds a recess 24 which is set back in relation to the joining plane. In all or within at least some of the recesses 24 centrally an insertion socket 25 is formed into which a centering member is inserted when assembling the separable water tank. The centering members facilitate the assembly and act stabilising and force transmitting in the joined water tank.

Figures 5, 6:
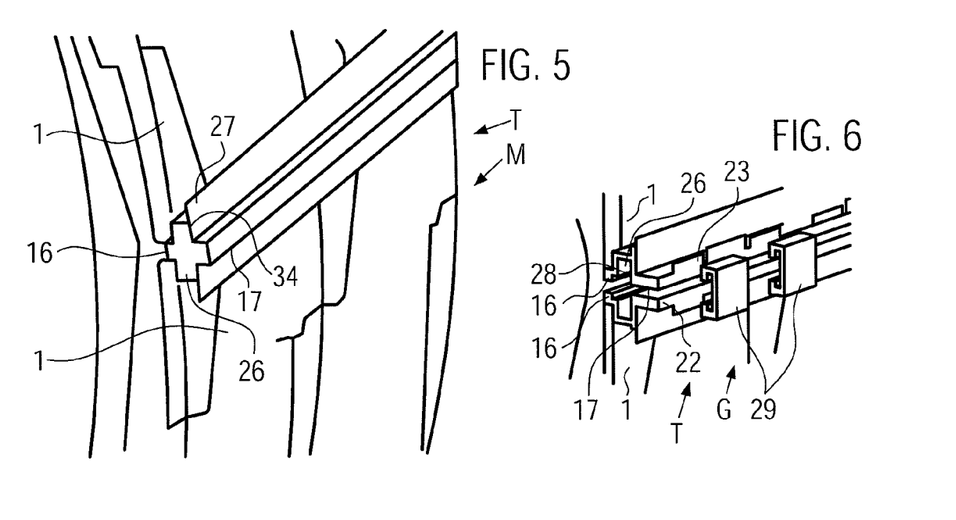
FIG. 5 a perspective view of a tank part.
FIG. 6 a perspective detail of the tank part shown in FIG. 5.

FIG. 5 shows a section of the monolithically assembled water tank T, by use of the two tank parts 1. In this case, the inner and outer fitting surfaces 16, 17 inclusive of the rib ends 18 and the extension surfaces 21 are welded tightly to each other. For the welding process the fitting surfaces are plasticised without contact, e.g. by means of heated welding surfaces or by welding elements. After either removing the fitting surfaces from the welding surfaces or after removing the welding surfaces from the fitting surfaces the plasticised fitting surfaces are pressed onto each other until welding beads are squeezed outwardly and inwardly in the joining plane. The sealing channels 26 do not contain any sealing means. In this case, the sealing channels 26 even contain parts of the welding beads. Furthermore, in this case, it is not necessary to insert centering members into the insertion sockets 25. An outer wall 34 of each sealing channel 26 is prolonged by a flange 27 which extends away from the joining plane.

After the welding process the outer welding bead, and in some cases, a part of the flange 22 and the clamping skewbacks 23 may be removed, since these components do not have any function in the monolithic water tank. It is to be noted that these components, however, may remain even on the monolithic water tank T.

FIG. 6 shows a similar view like FIG. 5, however, for the separable water tank T which is assembled by use of quick connectors 29 having the shape of clamps which are pushed in circumferential direction over the clamping skewbacks 23 at the flanges 22 and which then are fixed there. Sealing means 28 is inserted into the sealing channels 26 which are alighted with each other. The sealing means generates the sealing effect between the tank parts 1 due to the tension generated by the quick connectors 29. In this case, the fitting surfaces 16, 17 may be distant from each other or may contact each other with weak contact pressure. The separable water tank T is assembled on site, after the tank parts 1 have been transported accordingly. Centering members are inserted in some or in all insertion sockets 25 for facilitating the assembly.

Figure 7:
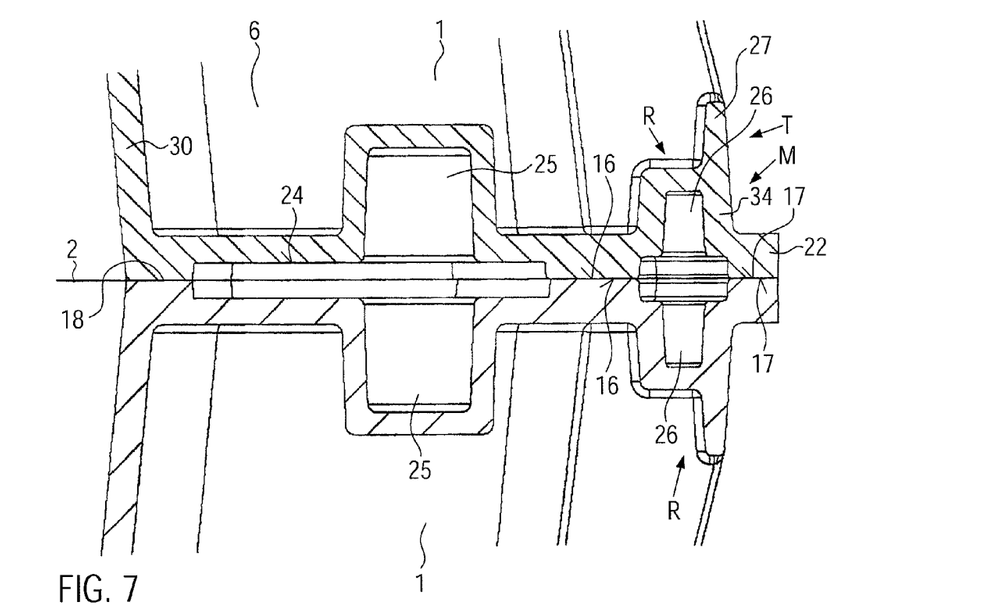
FIG. 7 an enlarged section of the joint region of the monolithic version of the water tank.

FIG. 7 is a sectional view belonging to FIG. 5 and shows how the inner and outer fitting surfaces 16, 17 directly abut on each other and are welded to each other, as also the rib ends 18. The insertion sockets 25 remain free, as also the sealing channels 26. The width of each inner fitting surface 16 amounts to at least about 150% of the wall thickness x of the tank part wall 30. The width of the outer fitting surface 17 amounts to at least about 150% of the thickness X of the outer sealing channel wall 34. The outer region of the flange 22, in FIG. 7, already is removed together with the outer welding bead. The recesses 24 in the rib ends 18 in pairs define chambers which communicate with the insertion sockets 25. The sealing channels 26 form a circumferentially continuous, isolating hollow chamber between the welded opening edge structures R. The cavities at the locations 24, 25, 26 partly are occupied by the produced welding beads.

Figure 8:
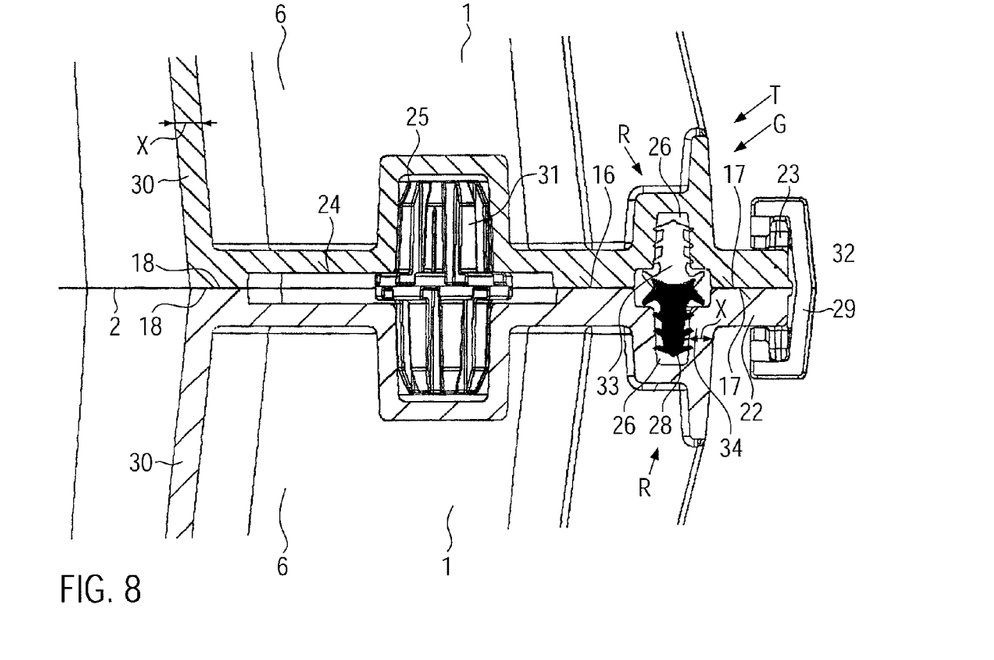
FIG. 8 an enlarged section of the joint region of the separable water tank.

FIG. 8 is a detailed sectional view of the joint region of the separable water tank according to FIG. 6. A centering member 31 having the shape of a double cone is inserted into the insertion socket 25 which are aligned with each other. The centering member 31 seats with axial clearance a land in the cavity as defined by both recesses 24. The inner and outer fitting surfaces 16, 17 and also the rib ends 18, in some case, may abut on each other. The sealing means 28 is inserted into the sealing channels 26. The sealing means may be a unitary sealing or, as shown, may be combined from two sealing strips 33 which have mirror image cross-sections. The flange 22 of each opening edge structure R is formed with an outwardly protruding prolonging flange 32 at which the clamping skewbacks 23 are formed. The quick connectors 29 are C-shaped clamps which are pushed over the clamping skewbacks 23 and which hold the sealing 33 compressed. The widths of the inner and outer fitting surfaces 16, 17 in relation to the thickness x of the tank part wall 30 and the outer sealing channel wall 34 already have been explained for to FIG. 7.

Figure 9:
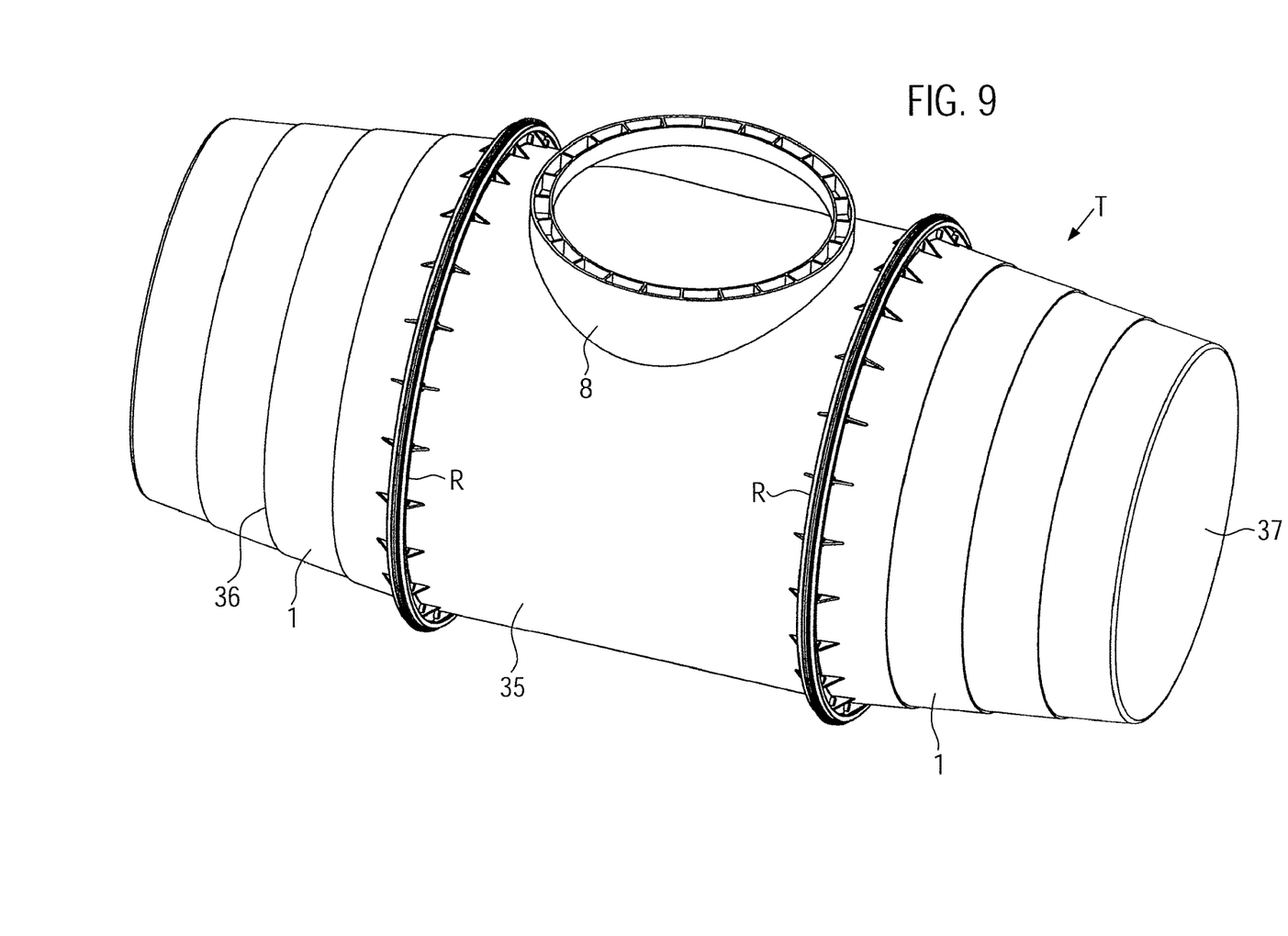
FIGS. 9, 10, 11 are perspective views of further embodiments.

The water tank T in FIG. 9 is assembled from two identical cup-shaped round tank parts 1 having circumferential ribs 36 and e.g. flat bottoms 37, and from at least one (or with several for a modular extension) cylindrical tank parts 35 (monolithically as shown, or with clamps). The dome boss 8 is formed in the tank part 35. The tank part 35 has at both openings the already explained or similar opening edge structures R which fit to each other.

Figure 10:
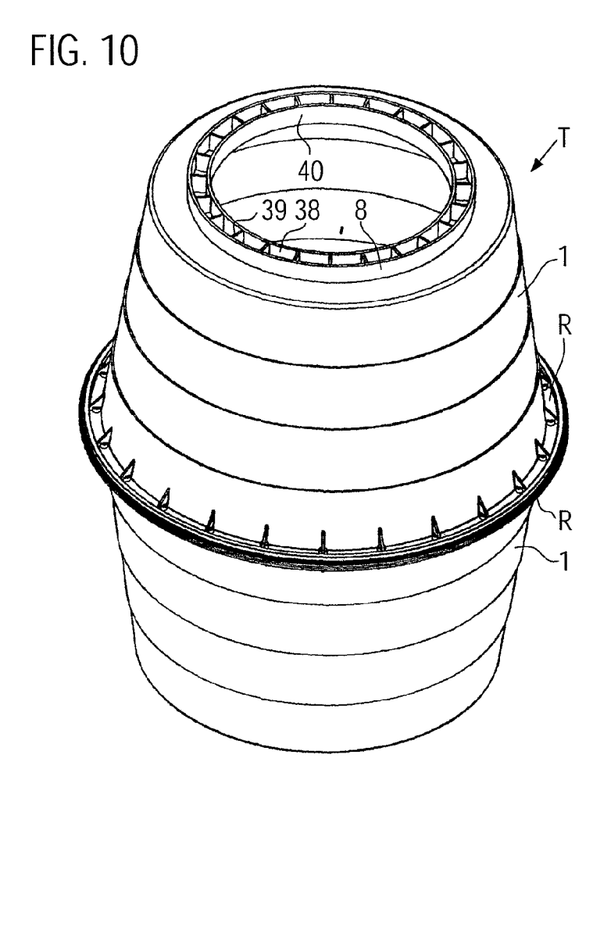

In FIG. 10 the water tank T for installation in the soil (either monolithically welded, as shown, or with clamps, not shown) is assembled from the two tank parts 1, e.g. corresponding to the tank parts from FIG. 9. One of the dome bosses 8 is opened by removing the lid disc 14 (FIG. 2) such that an opening is formed facilitating the mounting of a cover lid or a tank dome (not shown). The edge 38 of this opening is double-walled and reinforced by radial ribs. The opening is bounded at the inner side by an annular flange 40.

Figure 11:
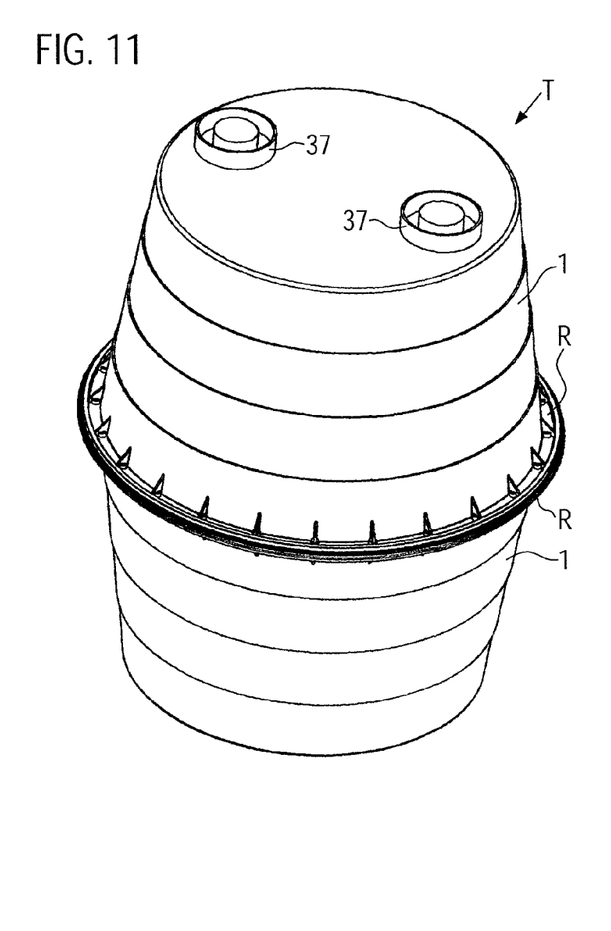

The tank parts 11 of FIG. 11 are distinguished from the tank parts from FIG. 10 in that in the flat upper side e.g. two diametrically opposed connection tubes 37 are formed of which the upper could be opened e.g. for using the water tank T when installed on the ground.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

The invention claimed is:

1. A water tank made from plastic material, which water tank is to be joined from at least two open identical injection molded or injected molded and embossed tank parts, the tank parts having opening edge structures matching each other in a joining plane of the water tank, each opening edge structure having a flat inner opening edge continuing a wall of the tank part, a sealing receiving channel for a sealing means, the sealing receiving channel being open towards the joining plane, and an outer flat opening edge continuing a wall of the sealing receiving channel, the opening edges being aligned with each other in the joining plane in joined condition of the water tank and being inner and outer fitting surfaces respectively with a width exceeding the thickness of the wall of the tank part and the wall of the sealing receiving channel by at least about one half, the opening edge structures being designed such that the water tank is to be assembled in a separable watertight tank version by local releasable clamping joining of the opening edge structures, wherein the water tank at least substantially has a shape of a hollow cylinder consisting of substantially semi-cylindrical tank parts each having outwardly rounded end caps, wherein a cylinder axis is situated in the joining plane, ribs in each tank part being arranged parallel to each other in both end caps and in the semi-cylindrical parts with the ribs formed in the end caps terminating with a respective distance from the first and last ribs of the semi-cylindrical parts, and wherein the ribs are tapering inwardly and define at each rib end a closed, substantially trapezoidal or triangular cross-section within the opening edge structure, wherein an extension of the inner fitting surface defined by each rib end has a shape of a closed strip following a shape of the rib cross-section and having substantially constant width, the edge strip surrounding a recess which is set back in relation to the joining plane, and wherein an insertion socket for inserting a centering member is formed in the recesses of the rib ends of at least some of the ribs.

2. A water tank according to claim 1, wherein the plastic material is HDPE or PP (high density polyethylene or polypropylene).

3. A water tank according to claim 1, wherein the opening edge structure is provided with clamping skewbacks along a circumference, the clamping skewbacks being located directly at an outer side of the outer fitting surface or at spaced part locations at a prolonging flange extending adjacent to the outer fitting surface.

4. A water tank according to claim 1, wherein a round dome boss is formed into the semi-cylindrical part substantially midway between the end cap halves, the ribs of the semi-cylindrical part being interrupted in the dome boss and that the dome boss contains a cover lid which is parallel to the joining plane and which extends substantially flush with an outer contour of the end cap halves.

5. A water tank according to claim 4, wherein a separation wall holding pocket is formed between respective two ribs in the semi-cylindrical part of the tank part, the holding pocket being open in the joining plane wherein within at least one separation wall holding pocket between two of the ribs of the semi-cylindrical part at least one sealing holding web is formed, the sealing holding web extending across an inner side of the cover lid in the dome boss and terminating in the joining plane as a supplemental extension of the inner fitting surface.

* * * * *